Jan. 8, 1963 A. HAKIMOGLU 3,072,837

MAGNETIC MULTIVIBRATOR AMPLIFIER POWER SUPPLY

Filed May 13, 1958 2 Sheets-Sheet 1

INVENTOR.
AYHAN HAKIMOGLU
BY
Francis V. Giolma
ATTORNEY

United States Patent Office 3,072,837

Patented Jan. 8, 1963

3,072,837

MAGNETIC MULTIVIBRATOR AMPLIFIER POWER SUPPLY

Ayhan Hakimoglu, Apalachin, N.Y., assignor to International Business Machines Corporation, New York, N.Y., a corporation of New York Filed May 13, 1958, Ser. No. 735,031
5 Claims. (Cl. 321—18)

Figure 1:
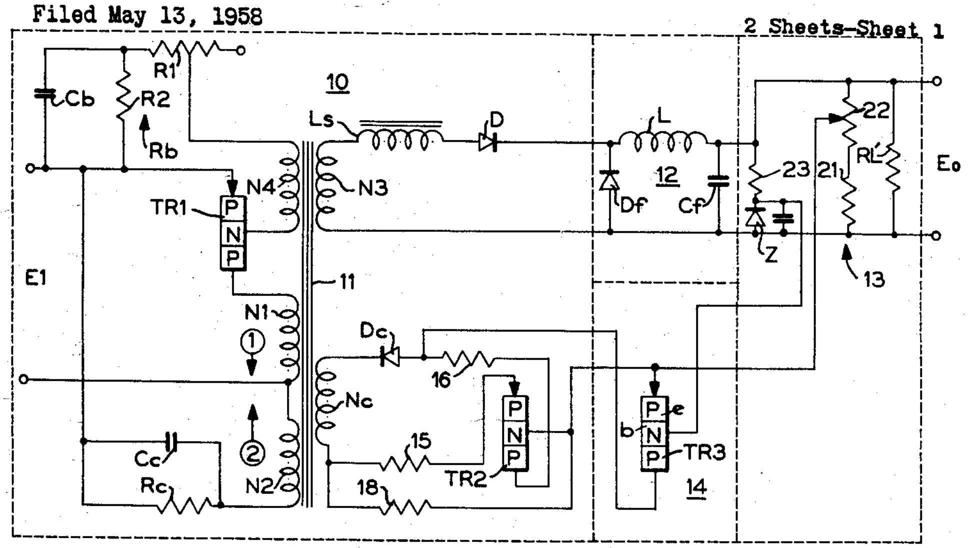

This invention relates generally to power supplies and has reference in particular to direct current power supplies.

Generally stated, it is an object of this invention to provide a controllable direct current power supply that is simple and inexpensive to manufacture and is efficient, reliable and is effective in operation.

More specifically, it is an object of this invention to provide a readily controllable multivibrator direct current type power supply.

Another object of the invention is to provide a free-running magnetic multivibrator source of direct current power.

Yet another object of this invention is to provide for controlling the reset time in an easily saturable square loop material core magnetic multivibrator and averaging the positive output pulses to provide a variable direct current voltage supply.

It is also an object of this invention to provide for using a magnetic multivibrator amplifier and a rectifier for supplying direct current to a load, and for utilizing an error signal between the voltage at the load and a reference source for controlling the reset time of the multivibrator.

It is also an important object of this invention to use rectifier and filter circuits with a magnetic multivibrator amplifier for supplying direct current power to a load circuit, and for using deviations from a normal value in the output voltage to control the reset time and hence average the value of the direct current output voltage of the amplifier.

Another important object of the invention is to provide for using a saturable initial current limiting inductor in series with a magnetic multivibrator amplifier and a choke filter circuit, so as to limit the initial current drawn by the choke filter in each output half cycle.

Other objects of the invention will be pointed out in the following description and claims and illustrated in the accompanying drawings, which disclose, by way of examples, the principle of the invention and the best mode, which has been contemplated, of applying that principle.

Figure 2:
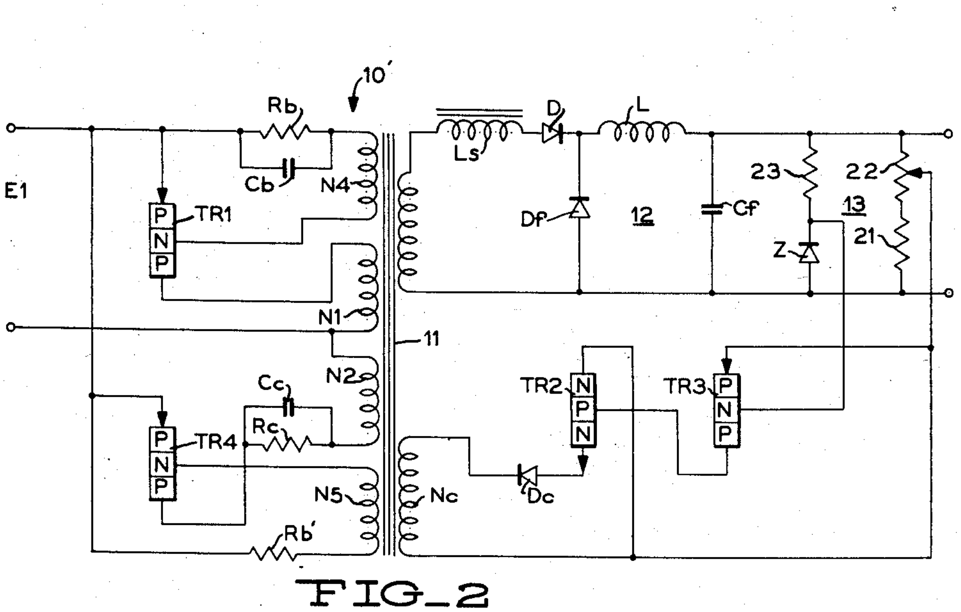
Figure 3:
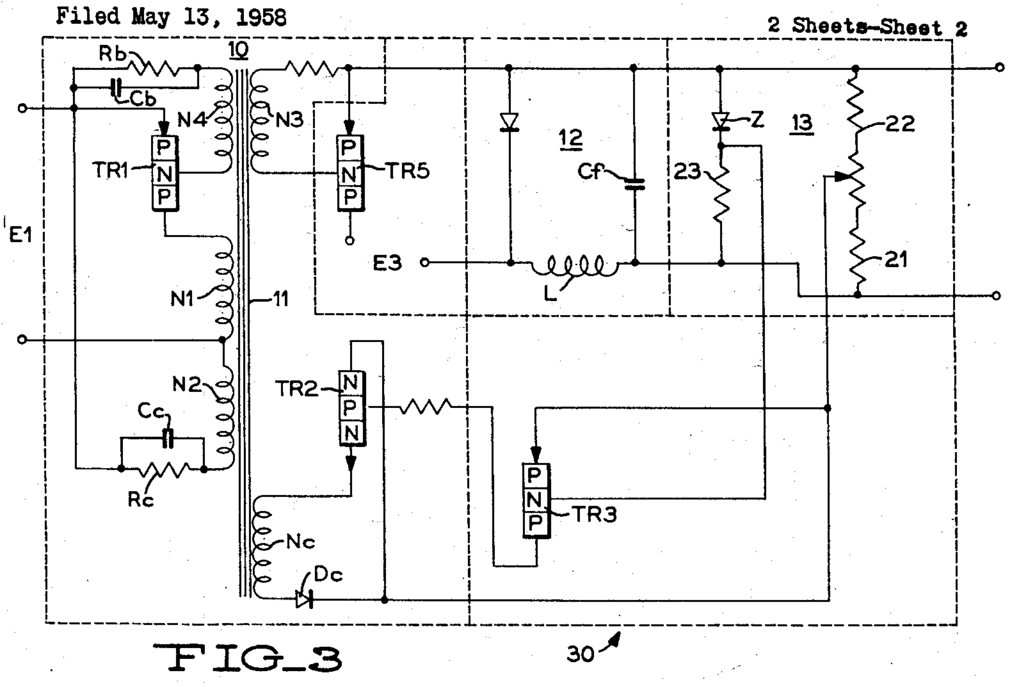
Figure 4:
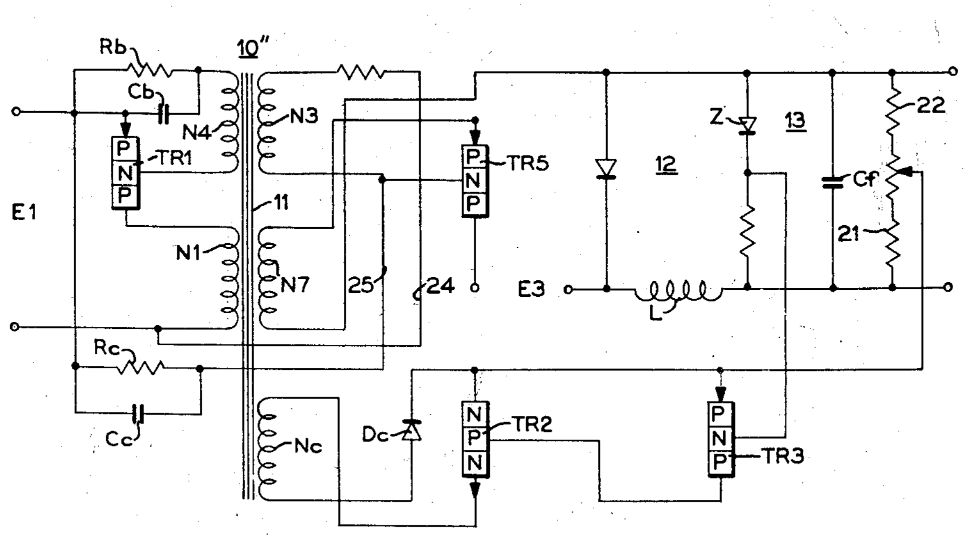

In the drawings:

FIG. 1 is a schematic diagram of a magnetic multivibrator amplifier power supply embodying the principle of the invention in one of its forms, FIG. 2 is a schematic diagram of a magnetic amplifier multivibrator power supply embodying the invention in a different form, FIG. 3 is a schematic diagram of a magnetic multivibrator amplifier power supply embodying the invention in yet another of its forms, and FIG. 4 is a schematic diagram of a magnetic amplifier multivibrator power supply embodying the invention in yet another of its forms.

Referring generally to FIG. 1, there is shown generally a magnetic multivibrator amplifier power supply comprising a magnetic multivibrator amplifier enclosed within the dotted enclosure 10, a filter circuit contained within the enclosure 12, an error detector circuit contained within the enclosure 13, and a signal amplifier contained within the enclosure 14.

The magnetic multivibrator amplifier 10 is generally of the type described in my copending application Serial No. 734,976, now Patent No. 3,034,072, entitled Magnetic Multivibrator Amplifier and filed concurrently with the present application. As shown in the copending application, the magnetic amplifier comprises a core 11 of substantially rectangular hysteresis loop material, having a plurality of windings N1, N2, N3, N4, and N*c* thereon. The winding N1 is connected by means of a transistor TR1 to a suitable source of direct current E1 to provide a substantially constant voltage input winding drive for saturating or setting flux in the core 11 in a positive direction. The winding N2 is also connected to the source E1, but in the opposite sense for providing reset of the magnetic flux in the core 11. An R-C circuit comprising a capacitor C*c* and resistor R*c* is connected in circuit with the reset winding for effecting reset and limiting the current thereof so as to provide a substantially constant current drive. The winding N4 is connected in circuit with the base "*b*" and emitter "*e*" of the transistor TR1 to provide base current for driving the transistor to saturation during the power half cycle flux setting time of the core 11. Resistors R1 and R2 are connected in series with the winding N4 to determine the base current of transistor TR1. A capacitor C*b* is connected in shunt with the base control resistor R2 for reducing the switching time of TR1. Control resistor R1 may be made adjustable for adjustably determining the base current of the transistor TR1. The output winding N3 is connected to a diode D for applying positive output pulses to a load circuit across which is connected a load bleeder resistor RL'. The control winding N*c* is connected to a diode D*c* to permit the flow of current therethrough during reset of the core 11. Control of the reset time is effected by connecting a transistor TR2 across the control winding N*c* through emitter and collector resistors 15 and 16, which together serve to limit the maximum control current. A stabilizing resistor 18 is connected between the base and emitter end of control winding N*c*.

The filter circuit 12 comprises a choke L connected in series with the output winding N3 and the load circuit and a shunt filter capacitor C*f*. A diode D*f* is connected across the input side of the choke L to provide for supplying a current to the choke during the control or reset half cycle.

The error detector circuit 13 comprises a voltage divider, including a resistor 21 and an adjustable resistor 22, connected substantially across the load circuit. A Zener diode Z, connected across the load circuit in series with a resistor 23, provides a substantially fixed reference source. The emitter "*e*" and base "*b*" of the error detector transistor TR3 are respectively connected to the resistor 22 and to a point intermediate the Zener diode Z and the resistor 23 for utilizing deviations from a normal value in the load or output circuit voltage for controlling the conductivity of the transistor TR3. Transistor TR3 is connected to the base "*b*" and collector "*c*" of transistor TR2 for controlling the conductivity thereof.

The magnetic multivibrator amplifier 10 is found to be free running and has a substantially rectangular output voltage characteristic, and the average value of the positive output pulses can be controlled by varying the conductivity of the control transistor TR2. As described in detail in my copending application hereinbefore referred to, when the input winding N1 and the reset winding N2 are connected to the source E1, two modes of operation may result.

(1) If the mmf. of the collector-leakage current is smaller than the mmf. of the current through the reset winding N2, then the voltage applied to the winding N2 sets the flux in the direction as shown by the arrow 2.

(*a*) While the flux in the core is setting in the direction shown by the arrow 2, the negative pulse voltage induced in the output winding in N3 is blocked by the diode D, and the output voltage E*o* across the load bleeder resistor RL′ is therefore substantially zero. At the same time, the voltage induced in the base control winding N4 by the change of flux in the core 11 is in a direction to keep the transistor TR1 at cutoff. However, the voltage drop across the resistor R*c* is equal to the magnetizing current I*s*2 through the winding N2, times R*c*. The voltage across the reset winding N2 is equal to E1–I*s*2R*c*.

As soon as the core saturates, the base-emitter voltage applied to the transistor TR1 from the winding N4 goes to zero, and an increased collector-leakage current can then flow through the transistor TR1. At the same time, an oscillatory action of R*c*–C*c* and the saturated inductance of reset winding N2 tends to reduce or reverse the current through N2 as follows:

When the core saturates, the voltage across N2 tends to go to zero. The current I*s*2 through the winding N2 increases very sharply, and all the voltage drop appears across the resistor R*c*. However, due to saturated inductance, the same amount of current I*s*2 is forced to flow through N2, even if the voltage across it becomes zero. This current charges the capacitor C*c* to a value near E1 or even exceeding E1 in the polarity as shown in FIG. 1. When the energy in the saturated core is completely discharged a reverse current, a current from ground to C*c* will flow through N2 if capacitor C*c* is charged greater than E1. If the voltage of capacitor C*c* does not exceed E1, the current will not reverse. However, the current flow through N2 will be reduced considerably to a value well under I*s*2. A resistance *r* is connected in the circuit in series with the capacitor C*c* to slow down the charging and discharging time of C*c*.

The reversal or decrease of current through N2 will cause the leakage current through the winding N1 to predominate and start setting the flux in the direction shown by the arrow 1. The voltage induced in the base control winding N4, due either to leakage current in the input winding N1 or the reverse current in the reset winding N2, is in a direction to drive the transistor TR1 to full conduction.

(*b*) During this half cycle, when the transistor TR1 is at full conduction and the flux in the core 11 is setting in the direction of the arrow 1, the voltage drop across the emitter to collector of the transistor TR1 is very small, and the full-applied voltage E1 is across the N1 winding. The output voltage, E*o*, however, across N3 or across the load circuit, is $$E1 \times \frac{N3}{N1}$$

provided that the saturated voltage drop across TR1 and the forward voltage drop across the diode D are negligible. The relationship of T1 equal to $$\frac{2\phi m N1}{E1}$$

still holds, and T2 equals $$\frac{2\phi m N2}{E2'}$$

E2′ is determined by E1 and the impedance across N*c*, so that $$E2' = E1 - Rc\left(Is2 + \frac{Bec}{Re + h11}\,\frac{Nc}{N2}\right)$$

where B is the amplification factor between base and collector currents of TR2, *h*11 is the input resistance of the transistor, and R*e* is the current limiting resistor in the base circuit. The average value of the output voltage E*o* equals $$T1\left(\frac{E1}{T1+T2}\right)\frac{N3}{N1}$$

or the following:

$$\frac{E1\frac{N3}{N1}}{1+\dfrac{E1N2}{E1 - Rc\left(Is2 + \dfrac{BecNc}{(Re+h11)N2}\right)N1}}$$

If the proper operation of the device is required to keep the emitter-to-collector voltage drop to a minimum, the value of R*b* has to be chosen so that the base current I*b* multiplied by the gain of the transistor is always greater than the collector current I*c*1. Therefore, the base resistance R*b* determines the value of base current, and hence the maximum output of winding N3.

If, for any reason, an attempt is made to draw more collector current through TR1 than a base current I*b* allows, a voltage drop appears across the emitter-collector of TR1. This reduces the voltage available across the winding N1, and hence reduces the voltage applied to the winding N4. This in turn causes the transistor TR1 to switch off, even for a deviation, which is relatively small, because the capacitor C*b* tends to hold the voltage across the resistor R*b* constant, and hence any reduction in the voltage of the winding N4 results in an immediate reduction of the voltage applied to the base circuit of the transistor.

When the core 11 saturates in the direction of the arrow 1, the magnetization current I*s*1 starts increasing very sharply. A sudden increase in I*c*1, due to common emitter-base impedance Z*eb* and C*b*, causes the emitter-base voltage to become reversed, so as to reduce I*b* and in turn to I*c* to zero. As soon as I*c* starts decreasing, the charge on the capacitor C*c* in the reset circuit starts supplying the magnetization current to further saturate the core in the same direction. The maximum current I*s*1 flows through the core when the voltage across the capacitance C*c* becomes equal to E1, and the voltage across the winding N2 becomes zero. However, the energy in the saturated core recharges the capacitance C*c* in the reverse polarity additive to E1 as voltage spikes, and starts resetting the flux in a direction of arrow 2.

(2) If the mmf. of the collector-leakage current exceeds the mmf. of the current in the winding N2, then the voltage E1 supplied to the winding N1 determines the setting of the flux in the direction shown by the arrow 1. However, the same events will take place in a reverse sequence described in the paragraphs *a*–*b*.

By applying the output of the winding N3 to the filter circuit 12, including a diode D*f*, the filter circuit operates to average out the positive output pulses so as to provide a substantially direct current voltage across the load circuit resistor bleeder RL′. A saturable inductance L*s* is connected in series with the output winding N3 and the filter circuit 12 so as to provide for initially limiting the current drawn by the choke L, so as to prevent overloading of the multivibrator 10, which might interfere with its operation.

Any deviation in the output voltage across the bleeder resistor RL′ is determined by matching the voltage across the resistor 21 against the voltage across the reference diode Z. Any differential therebetween is applied to the base circuit of the transistor TR3, which operates to vary the base current of the control transistor TR2 and hence, the voltage developed across the control winding NC during the reset half cycle. This controls the reset voltage across the reset winding N2 and hence, varies the reset time of the core 11 accordingly. By varying the reset time of the core, the spacing of the positive output pulses applied to the load circuit is changed and hence, the average value of the output voltage will be varied. The error voltage applied to the transistor TR3 will be in a direction to correct for any such excursion and will thus operate to regulate the output voltage of the power supply.

If the power supply for some reason is overloaded, this will result in trying to pull more current through the collector of transistor TR1 than the base current I*b* allows. A voltage drop therefore forms across the emitter-collector of the transistor TR1. This reduces the voltage applied to the input winding N1 and therefore the voltage induced across the base control winding N4. This in turn makes the transistor TR1 switch off, because of the capacitor C*b* in the base circuit tending to hold the voltage across the resistor R2 constant and reflecting any decrease of voltage directly to the base, while the collector current is being kept constant by the filter choke, and thus limits the maximum output of the power supply.

Referring to FIG. 2, it will be seen that a magnetic amplifier multivibrator 10′ is similarly connected through a saturating choke L*s* and a diode D to a filter circuit 12 comprising a choke L and a capacitor C*s* for applying a rectified direct current voltage to a load circuit across which is connected voltage divider load resistors 21—22. Any error voltage appearing between the adjustable tap connection between the resistors 21—22 and an intermediate connection between a Zener diode Z and a control resistor 23 is applied to a control transistor TR3 for controlling the conductivity of a control transistor TR2 for varying the affective voltage of the control winding N*c* substantially the same manner as described in connection with the multivibrator of FIG. 1. The multivibrator 10′ also has an input winding N1 connected by means of a transistor TR1 to a source of direct current voltage E1, and a base control winding N4 connected through an R–C circuit comprising a resistor R*b* and a capacitor C*b* for controlling the base current of the transistor TR1 to drive the transistor to saturation during the power half cycle of flux setting of the core 11. Instead of having the reset winding N2 connected directly to the source E1, a transistor TR4 is provided for switching the connection of the reset winding N2 under the control of an additional reset base control winding N5 which is provided for controlling the base current of the transistor TR4. Resistors R*b′* and R*c′* control the switching time of TR4 in the same manner that R*b* and R*c* control the switching time of TR1. The mode of operation of the multivibrator 10′ is substantially similar to that of the multivibrator 10, and is also described in detail in my copending application hereinbefore referred to.

Referring to FIG. 3, it will be seen that the reference numeral 30 designates generally a magnetic multivibrator amplifier power supply wherein a magnetic multivibrator amplifier 10 is provided for controlling switching, e.g., the nonconducting period with respect to the fully conducting period of a power transistor TR5, which is connected in series circuit relation between a power source E3 and the voltage divider load resistors 21—22, through a filter circuit 12. An error circuit 13, utilizing load voltage divider resistors 21—22 and a Zener diode Z in the manner hereinbefore described in connection with FIGS. 1 and 2, likewise applies an error signal to the control transistor TR2 through a signal amplifier TR3 for controlling the voltage developed by the control winding N*c*. Utilized in this manner, the magnetic amplifier 10 merely utilizes the positive output pulses to control the conductivity or nonconductivity of the transistor TR5, which acts like a switch connected in series with the source E3 and the load circuit to regulate the average output voltage at the load circuit by varying the off time with respect to on time.

Referring to FIG. 4, it will be seen that a magnetic amplifier multivibrator 10″ having an input winding N1, an output winding N3, a control winding N*c*, and a base control winding N4 is herein utilized to control the duration of the negative base voltage and hence, the cutoff time of the power transistor TR5, which is as in the circuit shown in FIG. 3, connected in series wtih a direct current source E3 and the load circuit. A filter circuit 12 and an error circuit 13 are utilized for filtering and controlling the control voltage developed by the control winding N*c* through a signal amplifier TR3, which controls the conductivity of the control transistor TR2 in a manner hereinbefore described. Instead of providing the magnetic amplifier 10″ with a separate reset winding N2, the output winding N3 is connected to the source E1 by means of conductors 24 and 25, which provide for energizing the output winding during the reset half cycles from a source E1 to effect reset of magnetic flux in the core 11. A current limit winding N7 is connected in series with the load circuit to modify the current in N1 in accordance with the load current and hence, limit the output current. The collector current through N1 and TR1 with N7 winding in the circuit becomes approximately $$Ib2\frac{N2}{N1}+IL\frac{N7}{N1}+\frac{N4}{N1}Ib1$$

where I*b*1, I*b*2 are the respective base currents and IL is the load current. An overload on the output current IL will therefore be directly reflected to the collector and will try to increase their collector current. However, when the filter tries to pull more current than the base current of TR1 would allow, the transistor TR1 will switch off as explained before. Otherwise, the power supply of FIG. 4 operates in substantially the same manner as the power supply described in connection with the circuit shown in FIG. 3.

In a typical power supply, such as shown in FIG. 1, the following values may be taken as typical: winding N1, 200 turns of No. 16 conductor; winding N2, 100 turns of No. 22 conductor; winding N3, 315 turns of No. 16 conductor; winding N4, 50 turns of No. 22 conductor; and winding N*c*, 200 turns of No. 28 conductor. The winding N1 is connected to a 36.5 volt direct current source through a type 2N174 transistor TR1, R1 equals 25 ohms, R2 equals 8 ohms, C*b* equals 10 microfarads, C*c* equals .7 microfarad, and R*c* equals 250 ohms. The saturating choke L*s* comprises 25 turns of No. 14 conductor active in circuit with a diode D type 1N1302. The diode D*f* is of the same type, and the inductance L equals ½ millihenry, the capacitor C*f* equals 3000 microfarads. The diode Z is of the SV5 type connected in circuit with a 470 ohm resistor. The resistors 21—22 are 120 and 100 ohms, respectively, while the load bleeder resistor RL′ equals 15 ohms. The diode D*c* is of the type F, the resistor 16 is 51 ohms, the transistor TR2 is type 2N158, while the transistor TR3 is of the type 2N284A, resistor 15 equals 120 ohms, and resistor 18 equals 4700 ohms. The core 11 is of Orthonol tape .002 inch thick and 1.11 inches wide, wound in a toroid having an outside diameter of 2.1 inches and an inside diameter of 1.4 inches. Other values may be also utilized and is to be realized that the values given hereinbefore are typical of one application of the invention which has been utilized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a power supply, a magnetic multivibrator having a rectangular loop material core with a plurality of windings thereon, means including a transistor connecting one of said windings to be at times energized by a substantially constant voltage to set flux in the core in a positive direction, means connecting another one of the windings to apply a control voltage to the base of the transistor to maintain it conductive during setting of the core, means including a relatively high resistance device connecting yet another one of the windings to provide a substantially constant current drive to reset the core when it sets, a series transistor for connecting a direct current source to a load circuit, means connecting still another one of the windings to apply a variable frequency output signal to control conductivity of the series transistor, a transistor connected in circuit with a further one of said windings, and means including an error detecting circuit connecting the load circuit and a reference source to control said transistor of the further one of said windings for regulating the reset time of the core.

2. In a power supply; a series transistor for connecting a load circuit to a direct current source a magnetic multivibrator having a magnetic core with an input winding connected by controllable switch means to a direct current voltage source for substantially constant voltage energization to effect constant volt second saturation of the core, an output winding connected to effect control of the series transistor, a reset circuit including a relatively high resistance device connecting the output winding to the voltage source to effect constant current reset of the core, and a control winding; a transistor connected across said control winding, and means including a rectifier and an error circuit including a Zener diode reference source and a voltage divider connected to the load circuit and to the control winding transistor to regulate the reset time of the core.

3. A power supply comprising; means including a series transistor and a filter circuit for connecting a load circuit to a source; a magnetic multivibrator amplifier having an output winding connected to apply a variable frequency signal to control base current of the transistor, and having a plurality of other windings; means connecting one of said other windings to effect substantially constant voltage energization thereof at times to set the core; means connecting another one of said other windings to affect substantially constant current reset of the core in between said times; an error circuit comprising a voltage divider and a Zener diode reference source across the load circuit; a transistor connected in circuit with another one of said windings, and means including a transistor error signal amplifier and a diode connecting the error circuit to control the transistor of said yet another one of said other windings for varying the reset time of the core in response to variations in error signal.

4. In a power supply, means including a series transistor connecting a load circuit to a direct current source, a multivibrator having a magnetic core with an output winding connected to provide a variable frequency base current for switching the transistor during setting of the core and having a plurality of other windings, controllable switch means for at times connecting one of said other windings to be energized with a substantially constant voltage drive to set the core, means connecting another one of said other windings to retain the switch means operated during setting of the core, means including a reference source and a voltage divider across the load circuit connected to effect energization of yet another one of said other windings to regulate the reset time of the core, and means including a relatively high resistance device connecting the output winding to effect substantially constant current reset of the core between times of setting.

5. In a power supply; a series transistor for connecting a load circuit to a direct current source; a magnetic multivibrator having a magnetic core with an input winding connected by controllable switch means to a direct current voltage source, an output winding connected to apply a variable frequency square wave signal to effect control of the series transistor, and a control winding; a transistor connected in circuit with the control winding, a current limit winding connected in circuit with the load circuit; and means including a rectifier and an error circuit including a Zener diode reference source and a voltage divider connected to the load circuit and to the transistor of the control winding to regulate the reset time of the core.

References Cited in the file of this patent

UNITED STATES PATENTS

| | | |
|---|---|---|
| 2,751,545 | Chase | June 19, 1956 |
| 2,810,105 | Henrich | Oct. 15, 1957 |
| 2,848,614 | Lyons | Aug. 19, 1958 |
| 2,850,236 | Schaefer et al. | Sept. 2, 1958 |
| 2,878,440 | Jones | Mar. 17, 1959 |
| 2,953,741 | Pittman et al. | Sept. 20, 1960 |